(12) United States Patent
Tracht

(10) Patent No.: US 8,398,112 B2
(45) Date of Patent: Mar. 19, 2013

(54) VEHICLE SEAT SIDE AIR BAG SYSTEM

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/470,925

(22) Filed: May 14, 2012

(65) Prior Publication Data

US 2012/0223553 A1    Sep. 6, 2012

Related U.S. Application Data

(62) Division of application No. 10/904,845, filed on Dec. 1, 2004, now abandoned.

(51) Int. Cl.
*B60R 21/16* (2006.01)

(52) U.S. Cl. ............... 280/728.2; 280/728.3; 280/730.2

(58) Field of Classification Search ............... 280/728.2, 280/728.3, 730.2
See application file for complete search history.

(56) References Cited

U.S. PATENT DOCUMENTS

| | | | |
|---|---|---|---|
| 5,762,363 A | 6/1998 | Brown et al. | |
| 5,816,610 A | 10/1998 | Higashiura et al. | |
| 5,860,673 A | 1/1999 | Hasegawa et al. | |
| 5,938,232 A | 8/1999 | Kalandek et al. | |
| 6,045,151 A | 4/2000 | Wu | |
| 6,206,410 B1 | 3/2001 | Brown | |
| 6,213,498 B1 * | 4/2001 | Ghalambor et al. | 280/730.2 |
| 6,237,934 B1 | 5/2001 | Harrell et al. | |
| 6,352,304 B1 | 3/2002 | Sorgenfrei | |
| 6,450,528 B1 | 9/2002 | Suezawa et al. | |
| 6,588,838 B1 | 7/2003 | Dick, Jr. et al. | |
| 7,134,685 B2 | 11/2006 | Panagos et al. | |
| 7,393,005 B2 * | 7/2008 | Inazu et al. | 280/730.2 |
| 7,458,603 B2 * | 12/2008 | Buono et al. | 280/728.2 |
| 7,669,889 B1 * | 3/2010 | Gorman et al. | 280/730.2 |
| 7,677,596 B2 * | 3/2010 | Castro et al. | 280/730.2 |
| 2002/0063452 A1 | 5/2002 | Harada et al. | |
| 2006/0113761 A1 | 6/2006 | Tracht | |
| 2006/0113772 A1 | 6/2006 | Tracht | |

FOREIGN PATENT DOCUMENTS

| | | |
|---|---|---|
| EP | 0 782 944 | 7/1997 |
| EP | 0 788 940 | 12/1999 |
| EP | 0 990 566 | 4/2000 |
| FR | 2861350 | 10/2003 |
| JP | 8225052 | 2/1995 |

* cited by examiner

*Primary Examiner* — Toan To

(74) *Attorney, Agent, or Firm* — Brooks Kushman P.C.

(57) ABSTRACT

A side air bag restraint sub-assembly is disposed in a cavity in a vehicle seat. A reinforcement panel is secured to either the inflator bolts or the seat fame on one edge. The opposite edge of the reinforcement panel is sewn to a hem on one side of a tear seam.

11 Claims, 3 Drawing Sheets

VEHICLE SEAT SIDE AIR BAG SYSTEM

CROSS-REFERENCE TO RELATED APPLICATIONS

This application is a division of U.S. application Ser. No. 10/904,845 filed Dec. 1, 2004 the disclosure of which is incorporated in its entirety by reference herein.

BACKGROUND OF THE INVENTION

1. Field of the Invention

The present invention relates to a system for a vehicle seat mounted side air bag restraint.

2. Background Art

Air bag restraint systems for a vehicle seat are used to protect vehicle occupants in the event of a side impact. Air bag restraint systems must deploy rapidly and predictably to be effective. Vehicle seats generally include a rigid frame to which urethane foam pads are secured. The seat is typically enveloped within a cover made of vinyl, cloth or leather. An air bag module, including an air bag and an inflator system, is secured to the seat frame.

The softness and elasticity of covering materials and urethane foam padding present problems for air bag deployment. As the air bag deploys, it must be channeled so that the air bag deploys through an air bag tear seam in the seat cover material. The elasticity of the seat cover material allows the air bag to expand and cause the seat cover material to bulge. This may increase air bag deployment time and result in variability in air bag deployment location. The resiliency and tendency of the foam material to deform or fragment is another problem that must be solved.

One attempt to solve the above problems is disclosed in U.S. Pat. No. 6,045,151 to Wu that employs a force concentrator that at least partially surrounds the folded air bag and concentrates or directs the force of the inflating air bag to the intended deployment site. The force concentrator avoids application of air bag deployment forces on the trim cover material to reduce the influence of the trim cover on air bag deployment. The force concentrator is an inelastic structure that surrounds or at least partially surrounds the air bag in an air bag module. This patent requires two panels to form the force concentrator. The use of two panels complicates assembly and may require that multiple pieces be joined together by seams. The Wu patent also discloses that a single panel may work on only one side of the deployment seam, but states that it must be verified that the addition of the concentrator does not induce trim cover failure elsewhere.

Applicant's invention is directed to solving the above problems as summarized below.

SUMMARY OF THE INVENTION

According to one aspect of the present invention, a vehicle seat assembly is provided that comprises a frame and a pad formed of a shaped structural foam material. The pad defines a pocket for receiving an air bag restraint sub-assembly that is assembled to the frame. The restraint sub-assembly has a housing in which an air bag and an inflator are received. The housing has a split line that functions as a stress riser in a wall of the housing. Upon inflation of the air bag by the inflator, the air bag is deployed through the split line. A trim cover is assembled to the pad and substantially encloses the frame, the pad, and the restraint sub-assembly. The trim cover has a tear seam that opens when the air bag is deployed. A reinforcement panel extends partially around at least one side of the housing and between the housing and the trim cover. The reinforcement panel is held in engagement with the frame by the inflator. The reinforcement panel is secured to a single side of the trim cover at the tear seam. The reinforcement panel resists elastic deformation of the trim cover when the air bag is deployed and channels the air bag during deployment toward the tear seam.

According to other aspects of the invention, a reinforcement layer may be secured to the pad adjacent to the pocket. The pocket has at least one wall that extends from an outer surface of the pad and into the pocket adjacent to the restraint sub-assembly. The reinforcement panel overlies the reinforcement layer. The air bag is channeled during deployment between the reinforcement panel and the reinforcement layer toward the tear seam. The reinforcement layer may be made of a fleece material that is molded in situ into the foam forming mold when the pad is formed.

According to other aspects of the invention, the inflator may be secured to the frame by at least one bolt that is retained on the frame by a nut. The reinforcement panel has at least one hole through which a the bolt of the inflator is received to secure the reinforcement panel to the frame.

According to another aspect of the invention, the tear seam is formed by two doubled back edges of the trim cover material that are sewn together by a tear seam stitch. The reinforcement panel is sewn to one of the doubled back edges of the trim cover.

According to other aspects of the invention, the restraint sub-assembly is a side air bag module and the pocket is located on the outboard wall of the seat back portion of the vehicle seat. The reinforcement panel may be a flexible, inelastic sheet of material that is less elastic than the trim cover. The reinforcement panel may be sewn to the trim cover.

According to another aspect of the present invention, a vehicle seat assembly is provided that comprises a frame and a pad formed of a shaped structural foam material. The pad defines a pocket in which an air bag restraint sub-assembly is placed. The air bag restraint sub-assembly has a housing in which an air bag and an inflator are received and which is assembled to the frame. The housing has a split line that functions as a stress riser. Upon inflation of the air bag by the inflator, the air bag is deployed through the housing of the split line. A trim cover is assembled to the pad and substantially encloses the frame, the pad, and the restraint sub-assembly. The trim cover has a tear seam that opens when the air bag is deployed. A reinforcement panel extends partially around at least one side of the housing and between the housing and a wall of the pocket. The reinforcement panel is held in engagement with the frame by the inflator. The reinforcement panel is secured to the trim cover at a location near the tear seam. The reinforcement panel protects the pad when the air bag is deployed and channels the air bag during deployment. The air bag is directed to deploy between reinforcement panel and the foam reinforcement toward the tear seam.

According to another aspect of the present invention, a vehicle seat assembly is provided that comprises a frame and a pad formed in the shape of a structural foam material that defines a pocket. An air bag restraint sub-assembly is placed in the pocket and assembled to the frame. The restraint sub-assembly has a housing in which an air bag and an inflator are received. The housing has a split line through which the air bag is deployed upon inflation of the air bag by the inflator. A trim cover is assembled to the pad that substantially encloses the frame, the pad, and the restraint sub-assembly. The trim cover has a tear seam that opens when the air bag is deployed. A reinforcement panel extends partially around at least one side of the housing between the housing and the trim cover. The reinforcement panel is held in engagement with the frame in a location that is spaced from the restraint sub-assembly. The reinforcement panel is secured to the trim cover at a location near the tear seam. The reinforcement panel resists elastic deformation of the trim cover when the air bag is deployed and channels the air bag during deployment toward the tear seam.

Other aspects of the present invention will be better understood in view of the attached drawings and following detailed description of several embodiments of the invention.

DETAILED DESCRIPTION OF THE PREFERRED EMBODIMENT(S)

Figure 1:
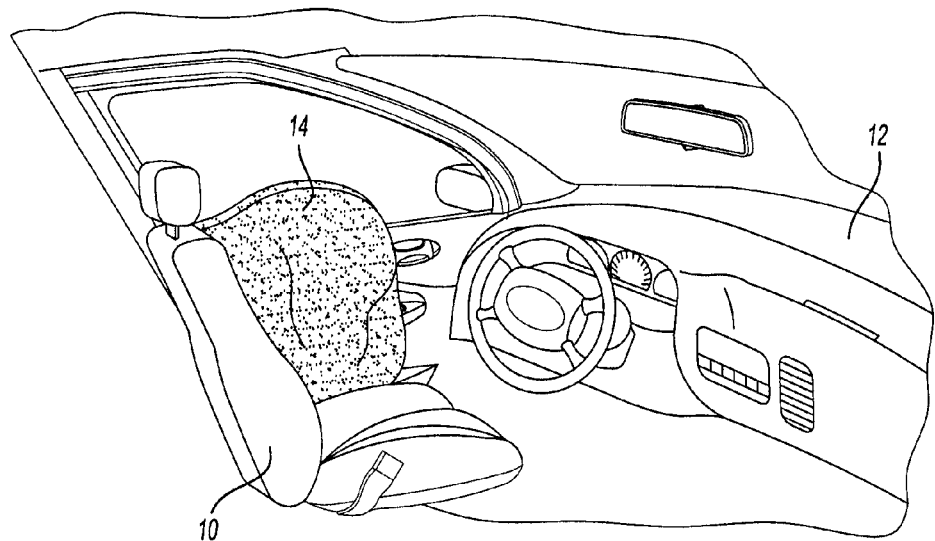
FIG. 1 is a fragmentary perspective view of the interior of a vehicle having a seat that is provided with a side air bag that is shown during deployment.

Referring now to FIG. 1, a seat 10 for vehicle 12 is shown with a side air bag 14 during deployment. The side air bag 14 is deployed in the event of a side impact to the vehicle 12. The side air bag 14 is deployed between the seat 10 and adjacent side of the vehicle 12 which is in most instances a vehicle door.

Figure 2:
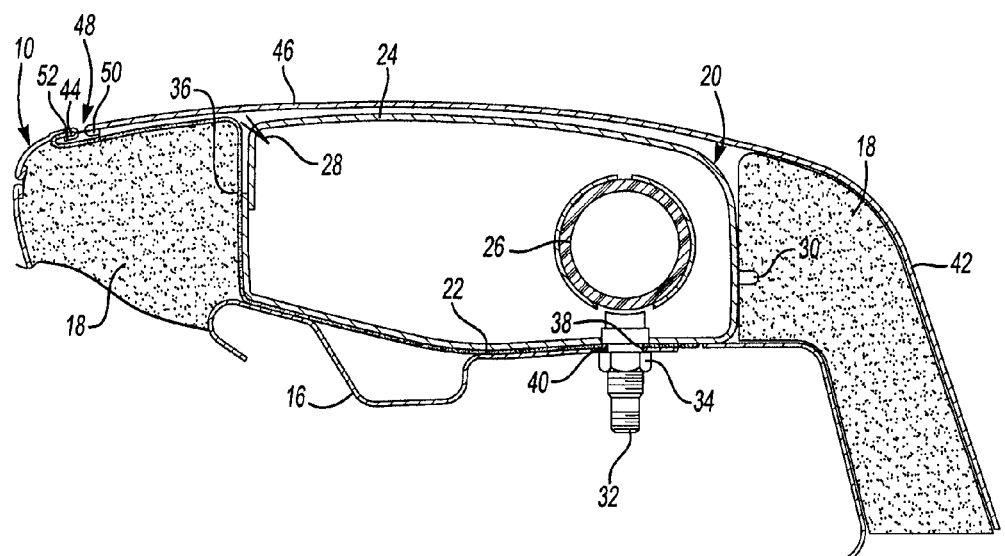
FIG. 2 is a fragmentary cross-sectional view of a vehicle seat having a side air bag module and a reinforcement panel made in accordance with one aspect of the present invention.

Referring to FIG. 2, the seat 10 is shown to comprise a frame 16 to which foam pads 18 are secured to form the seat structure. An air bag module 20 is received in the pocket 22 defined by adjacent foam pads 18. The air bag module 20 has a housing 24 in which the air bag 14 is received in a folded manner. An inflator 26 is a pyrotechnic device disposed within the housing 24 for rapidly inflating the air bag 14 in the event of a side impact. As the air bag 14 is inflated by the inflator 26, it separates the housing 24 at a split line 28. A butterfly hinge 30 may be provided generally on the opposite side of the housing 24 from the split line 28. The hinge 30 permits the housing to open in a controlled manner.

The air bag module 20 is secured to the frame 16 by inflator bolts 32 that are secured to the frame by a nut 34 or other type of fastener. A reinforcement panel 36 extends around the housing 24 generally from the inflator bolts 32 behind the housing and between a foam pad 18 and the air bag module 20 on one side. The panel 36 is preferably formed of a flexible but relatively inelastic fabric such as a nylon fabric or Tyvek or other material that is similar to the material used to form the air bag 14. The panel 36 includes holes 38 through which bolts 32 of the inflator 26 extend. The edge of the panel 36 through which the holes 38 extend may be referred to as the anchoring edge 40 of the reinforcement panel 36.

The seat 10 is enclosed in a cover 42 that covers the foam pads 18 and air bag module 20. The anchoring edge 40 is anchored between the air bag module 20 and the frame 16 as the seat 10 is assembled. The panel 36 extends from the inflator bolts 32 at the anchoring edge 40 behind the housing 24 and between the housing 24 and the foam pad 18. The panel 36 further extends to a cover or fixed edge 44 that is turned back on itself and is sewn to the cover 42 and is more specifically described with reference to FIG. 3 below. A cover flap 46 extends over the outer side of the air bag module 20. The cover flap is designed to open when the air bag 14 is deployed. The cover flap 46 is intended to open initially at a tear seam 48. The panel 36 is disposed between the module 20 and the cover 42.

Figure 3:
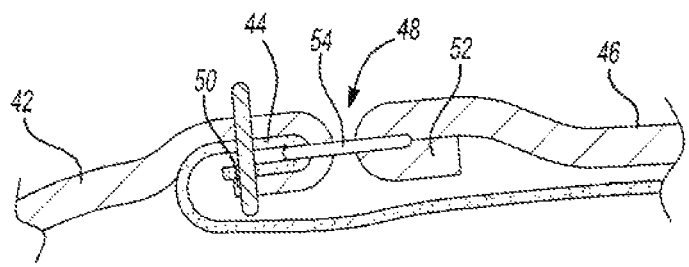
FIG. 3 is a fragmentary cross-sectional view of a tear seam to which a reinforcement panel is shown according to one embodiment of the invention.

Referring to FIG. 3, tear seam 48 is shown in greater detail. The reinforcement panel 36 is secured at a cover affixed reversely turned edge 44 to a panel hem 50. The cover flap 46 terminates at a flap hem 52. The panel hem 50 including the reversely turned edge 44 and flap hem 52 are secured together by means of tear stitches 54 that are constructed to tear in preferential manner before cover 42 or cover flap 46 will split under the pressure applied by the air bag 14 during deployment.

Figure 4:
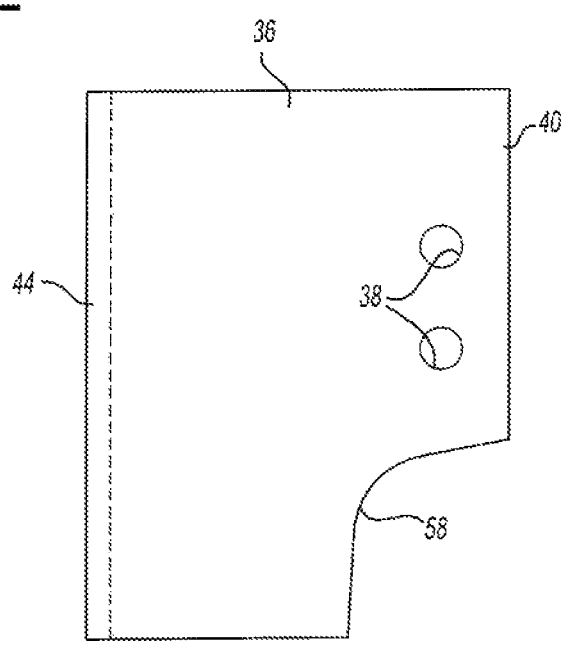
FIG. 4 is a plan view of a reinforcement panel made according to the present invention.

Referring to FIG. 4, the structure and shape of one embodiment of a reinforcement panel 36 is shown prior to being assembled to the air bag module 20. The panel 36 has holes 38 near the anchoring edge 40 and the panel hem 50, as shown adjacent the cover affixed edge 44. A trim cut-out 58 is shown in the lower corner of the panel. The trim cut-out 58 provides clearance for cables or wiring to the air bag module.

Figure 5:
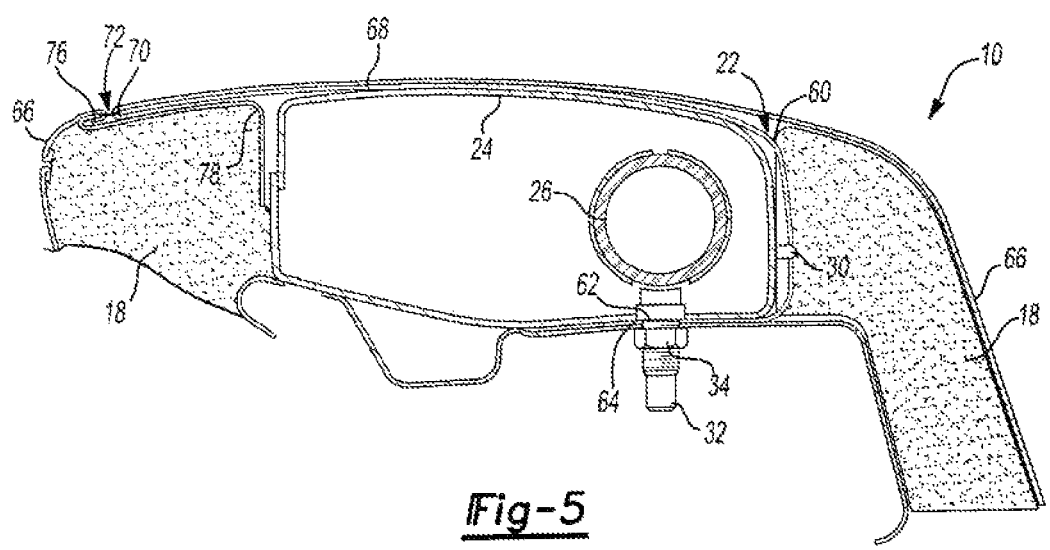
FIG. 5 is a fragmentary cross-sectional view of a vehicle seat having a side air bag module made according to another embodiment of the present invention.

Referring to FIG. 5, an alternative embodiment of the present invention is shown in which a reinforcement panel 60 extends across the outer side of the air bag module 20. The panel 60 has holes 62 near an anchoring edge 64. The holes 62 receive the inflator bolts 32 and is secured by nuts 34 as previously described with reference to FIG. 2. The panel 60 extends between the air bag module 20 and the cover 66. A cover flap 68 is defined where the cover 66 extends across the outer side of the air bag module 20. A cover flap 68 extends to a flap hem 70 that forms one part of the tear seam 72. A cover hem 76 together with the flap hem 70 are connected to form the tear seam 72.

A molded in situ foam reinforcement 78 is provided on a corner of the foam pad 18 adjacent the air bag module 20. The reinforcement 78 may be a fleece fabric that is laid in the mold when the foam pad 18 is formed.

Figure 6:
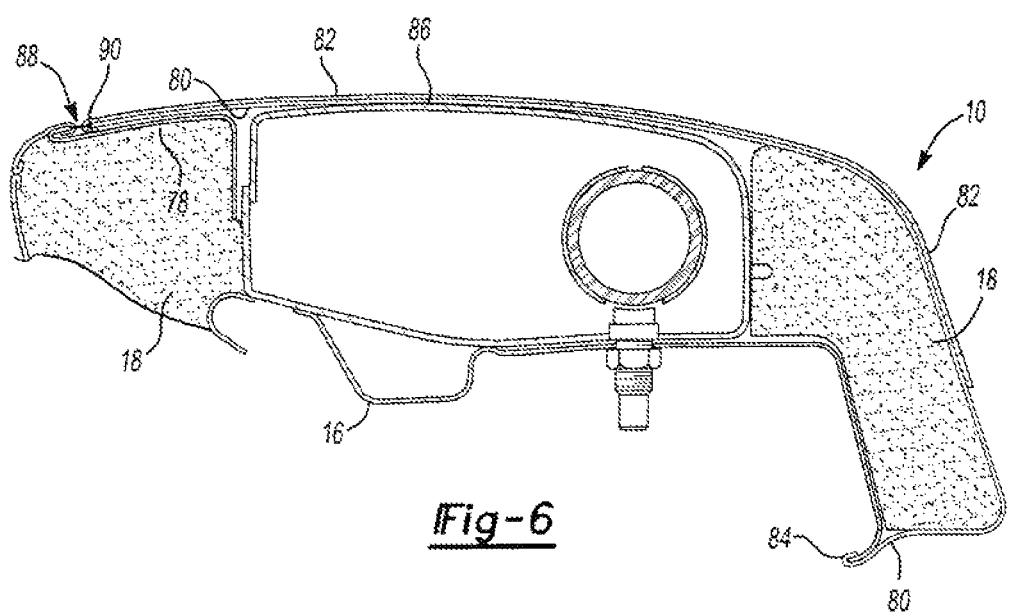
FIG. 6 is a fragmentary cross-sectional view of a vehicle seat having a side air bag module made according to another embodiment of the present invention.

Referring to FIG. 6, yet another alternative embodiment of the invention is shown wherein a panel 80 is sewn to a portion of a cover 82. The panel 80 is secured by a retainer clip 84 to a portion of the frame 16 of the seat 10. The panel 80 extends between the cover 82 and the foam pad 18. The panel 80 extends across the pocket 22 in which the air bag module 20 is received. The portion of the cover 82 extending across the pocket 22 is referred to as a cover flap 86. The panel 80 is preferably sewn to the cover 82 to reinforce the cover and prevent the cover from bulging when the air bag 14 deploys. The cover flap 86 terminates in a flap hem 90. The cover 82 terminates in cover hem 76 as previously described with reference to FIG. 5. The flap hem 90 and cover hem 76 are secured together to form a tear seam 88.

Figure 7:
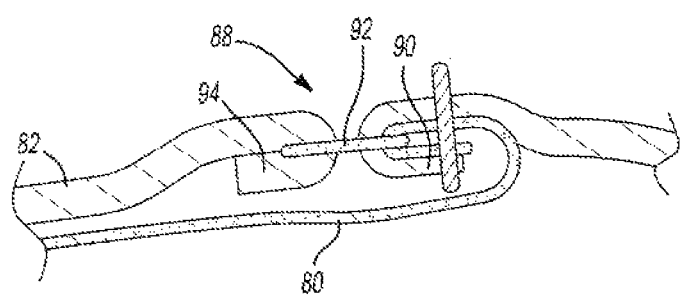
FIG. 7 is a fragmentary cross-sectional view of a tear seam to which a reinforcement panel is sewn according to one embodiment of the invention.

Referring to FIG. 7, the tear seam 88 is shown in greater detail. Tear stitches 92 are secured between the flap hem 90 and cover hem 94. The tear stitches 92 hold the cover flap 86 in position, as shown in FIG. 6, until the air bag 14 is deployed. Tear stitches 92 are intended to tear in a preferential manner so that the air bag 14 deploys through the tear seam 88 in a predictable manner.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
   a frame;
   a pad formed of a shaped foam polymer material, the pad defining a pocket;
   a air bag restraint sub-assembly being placed in the pocket and assembled to the frame, the restraint sub-assembly having a housing in which an air bag and an inflator are received, the housing having a split line that splits a wall of the housing, wherein upon inflation of the air bag by the inflator, the air bag is deployed through the split line;
   a trim cover assembled to the pad that substantially encloses the frame, the pad and the restraint sub-assembly, the trim cover having a tear seam that opens when the air bag is deployed;
   a reinforcement panel extends partially around at least one side of the housing and between the housing and the trim cover, the reinforcement panel is held in engagement with the frame by the inflator, wherein the reinforcement panel is secured to a single side of the trim cover at the tear seam, the reinforcement panel resisting elastic deformation of the trim cover when the air bag is deployed and channeling the air bag during deployment toward the tear seam; and
   a reinforcement layer secured to the pad adjacent to the pocket, the pocket having at least one wall extending from an outer surface of the pad and into the pocket adjacent to the restraint sub-assembly, wherein the reinforcement panel overlies the reinforcement layer and the air bag is channeled between the reinforcement panel and the reinforcement layer during deployment toward the tear seam.

2. The vehicle seat assembly of claim 1 wherein the reinforcement layer is made of a fleece material that is molded in situ into the pad.

3. The vehicle seat assembly of claim 1 wherein the inflator is secured to the frame by at least one bolt and is retained on the frame by a nut, and wherein the reinforcement panel has at least one hole through which the bolt of the inflator is received to secure the reinforcement panel to the frame.

4. The vehicle seat assembly of claim 1 wherein the tear seam is formed by two doubled back edges of the trim cover material that are sewn together by a tear seam stitch, the reinforcement panel being sewn to one of the doubled back edges of the trim cover.

5. The vehicle seat assembly of claim 1 wherein the restraint subassembly is a side air bag module and the pocket is located in an outboard wall of a seat back portion of the vehicle seat.

6. The vehicle seat assembly of claim 1 wherein the reinforcement panel is a flexible, relatively inelastic sheet of material that is less elastic than the trim cover.

7. The vehicle seat assembly of claim 1 wherein the reinforcement panel is sewn to the trim cover.

8. A vehicle seat assembly, comprising:
   a frame;
   a pad formed of a shaped foam polymer material, the pad defining a pocket;
   a air bag restraint sub-assembly being placed in the pocket and assembled to the frame, the restraint sub-assembly having a housing in which an air bag and an inflator are received, the housing having a split line, wherein upon inflation of the air bag by the inflator, the air bag is deployed through the split line;
   a trim cover assembled to the pad that substantially encloses the frame, the pad and the restraint sub-assembly, the trim cover having a tear seam that opens when the air bag is deployed;
   a reinforcement panel extending partially around at least one side of the housing and between the housing and the trim cover, the reinforcement panel being held in engagement with the frame at a location that is spaced from the restraint sub-assembly, wherein the reinforcement panel is secured to the trim cover at a location near the tear seam, the reinforcement panel resisting elastic deformation of the trim cover when the air bag is deployed and channeling the air bag during deployment toward the tear seam; and
   a reinforcement layer secured to the pad adjacent to the pocket, the pocket having at least one wall extending from an outer surface of the pad and into the pocket adjacent to the restraint sub-assembly, wherein the reinforcement panel overlies the reinforcement layer and the air bag is channeled between the reinforcement panel and the reinforcement layer during deployment toward the tear seam.

9. The vehicle seat assembly of claim 8 wherein the reinforcement panel is sewn to the trim cover.

10. The vehicle seat assembly of claim 8 wherein the tear seam is formed by two doubled back edges of the trim cover material that are sewn together by a tear seam stitch, the reinforcement panel being sewn to one of the doubled back edges of the trim cover.

11. The vehicle seat assembly of claim 8 herein the restraint subassembly is a side air bag module and the pocket is located in an outboard wall of a seat back portion of the vehicle seat.

* * * * *

UNITED STATES PATENT AND TRADEMARK OFFICE
CERTIFICATE OF CORRECTION

PATENT NO. : 8,398,112 B2
APPLICATION NO. : 13/470925
DATED : March 19, 2013
INVENTOR(S) : Michael L. Tracht et al.

Page 1 of 1

It is certified that error appears in the above-identified patent and that said Letters Patent is hereby corrected as shown below:

In the Claims

Column 5, Line 16, Claim 1:

After "defining a pocket"
Delete "a" and
Insert -- an --.

Column 6, Line 14, Claim 8:

After "defining a pocket"
Delete "a" and
Insert -- an --.

Column 6, Line 50, Claim 11:

After "assembly of claim 9"
Delete "herein" and
Insert -- wherein --.

Signed and Sealed this
Thirtieth Day of July, 2013

Teresa Stanek Rea
*Acting Director of the United States Patent and Trademark Office*